United States Patent [19]

Ray et al.

[11] 3,926,649

[45] Dec. 16, 1975

[54] BOROSPHATE GLASS COMPOSITIONS WITH HIGH WATER RESISTANCE AND LOW SOFTENING POINT

[75] Inventors: Neil Hunter Ray; John Nicholas Clayton Laycock; William Derek Robinson, all of Runcorn, England

[73] Assignee: Imperial Chemical Industries Limited, London, England

[22] Filed: Mar. 3, 1975

[21] Appl. No.: 554,693

Related U.S. Application Data

[63] Continuation of Ser. No. 293,538, Sept. 29, 1972, abandoned.

[30] Foreign Application Priority Data

Oct. 15, 1971   United Kingdom............... 48105/71

[52] U.S. Cl................................. 106/47 R; 106/54
[51] Int. Cl.$^2$........................................... C03C 3/16
[58] Field of Search.......................... 106/47 R, 47 Q

[56] References Cited
UNITED STATES PATENTS

| | | | |
|---|---|---|---|
| 2,291,958 | 8/1942 | Garrison | 106/47 R |
| 2,415,661 | 2/1947 | Sun et al. | 106/47 R |
| 2,423,128 | 7/1947 | Tillyer | 106/47 R |
| 2,477,649 | 8/1949 | Pincus | 106/47 R |
| 2,577,627 | 12/1951 | Pincus | 106/47 R |
| 2,920,972 | 1/1960 | Godron | 106/47 R |

OTHER PUBLICATIONS

Takahashi, K., *Advances in Glass Technology,* Plenum Press Inc. pp. 366–376 (1962).

*Primary Examiner*—Patrick P. Garvin
*Assistant Examiner*—Mark Bell
*Attorney, Agent, or Firm*—Cushman, Darby & Cushman

[57] ABSTRACT

Borophosphate glasses having both a low-softening point and good water resistance have the following compositions (moles %)

$(P_2O_5 + B_2O_3)$ 75 ± 2.5
alkaline metal oxide 25 ± 2.5
and a molar ratio $P_2O_5 : B_2O_3$ of from 15:1 to 6:1 where "alkaline metal oxides" include alkali metal oxides, alkaline earths and zinc oxide.

9 Claims, 2 Drawing Figures

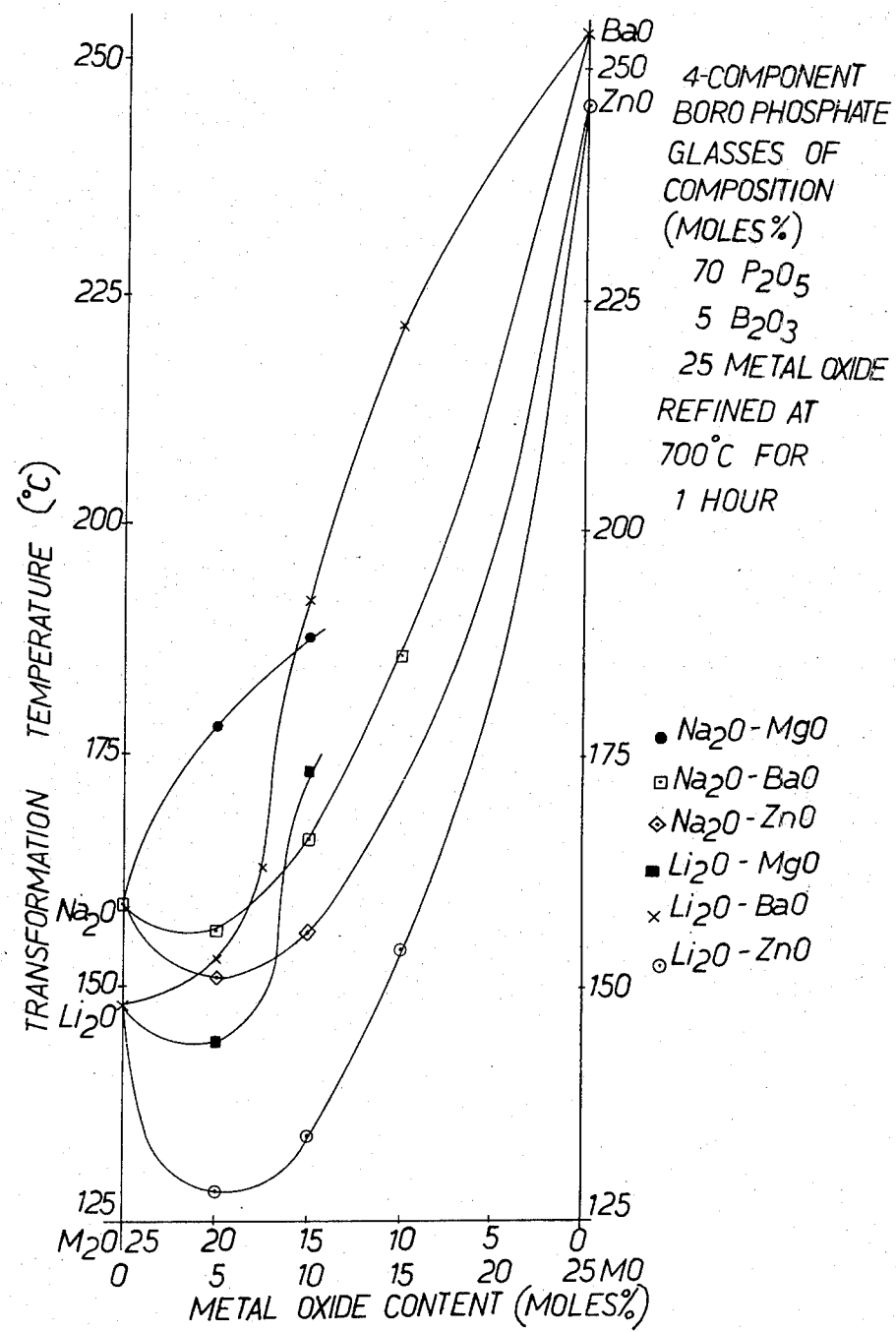

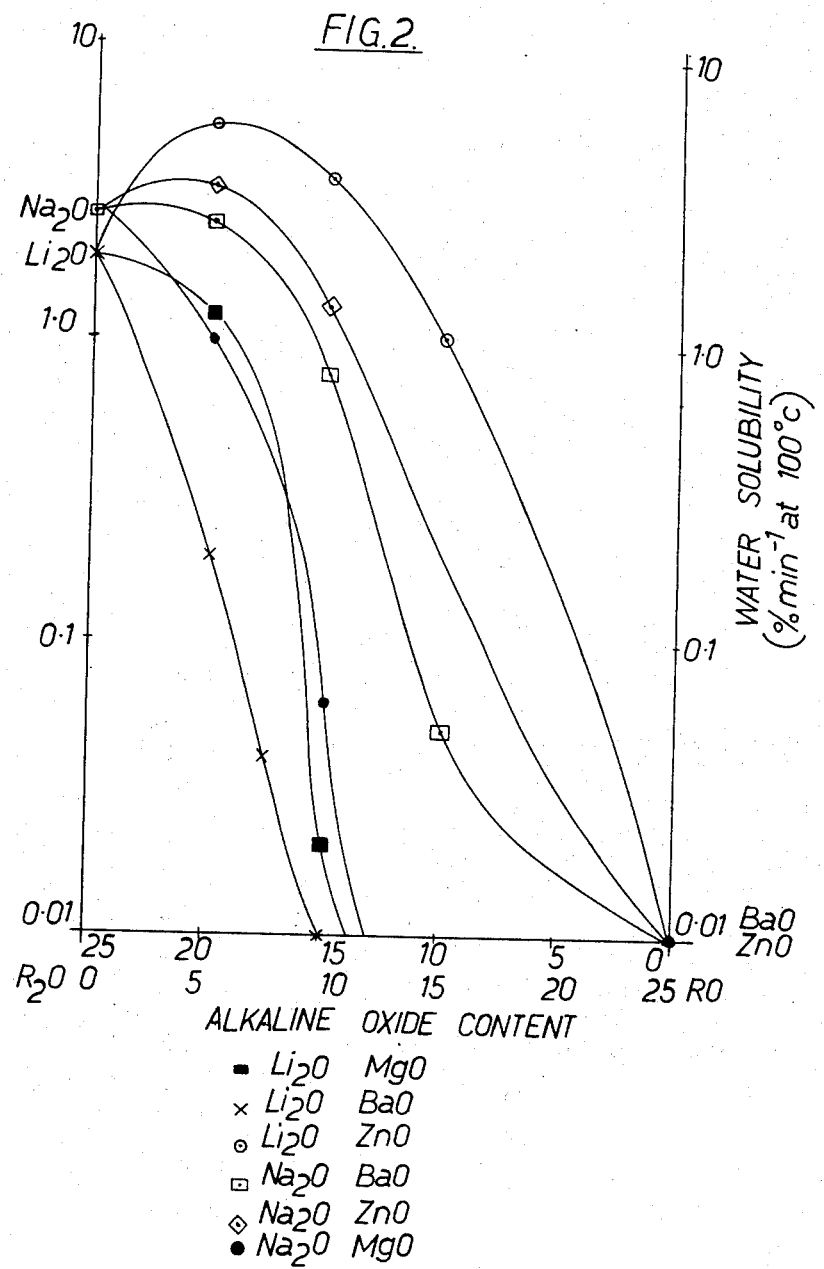

BOROSPHOSPHATE GLASS COMPOSITIONS WITH HIGH WATER RESISTANCE AND LOW SOFTENING POINT

This is a continuation of application Ser. No. 293,538 filed Sept. 29, 1972, now abandoned.

This invention relates to inorganic oxide glass compositions.

The glasses of the invention are borophosphate glasses; that is, they are glasses having a network structure comprising a random mixture of boric and phosphoric oxides. The glasses may be suitable for co-processing with organic polymers in composites as described in copending application Ser. No. 132,180, now U.S. Pat. No. 3,732,181 and with inorganic components as described in copending application Ser. No. 294,780, now abandoned.

Glasses having a low softening point usually are not very resistant to attack by water, water resistance usually increasing with softening point; we have found, surprisingly, that certain alkali borophosphate glasses comprising minor proportions of the oxides of one or more alkali metals, alkaline earth metals and/or zinc (hereinafter referred to for convenience merely as "alkaline metals") have both a low softening point and good water resistance expressed as rate of weight loss in boiling water or as rate of surface erosion by water at a given temperature.

Accordingly the invention provides inorganic oxide glasses having the following compositions (moles %):

$P_2O_5 + B_2O_3$ 75 ± 2.5
alkaline metal oxide 25 ± 2.5;

the total of the foregoing components being at least 99 moles % of the total composition, excluding water, and the molar ratio $P_2O_5 : B_2O_3$ being from 15:1 to 6:1. There may also be present a small proportion, up to, say, 1% of minor constituents such as $SiO_2$ and $Al_2O_3$. Preferably the compositions contain at least one alkali metal oxide together with at least one alkaline earth or zinc oxide. Suitable alkali metal oxides include $Li_2O$, $Na_2O$ and $K_2O$; and suitable alkaline earths include MgO, CaO and BaO.

The proportions of the various alkaline metal oxides can vary within wide limits, with consequent variation in the properties of the resulting glass. This variation is illustrated in FIGS. 1 and 2 of the attached diagrams, which show the effect of varying the ratio of alkaline oxides upon the transformation temperature and water solubility of the glass. Selection of an appropriate composition within the limits specified above to give a desired combination of properties will be facilitated by reference to the aforementioned diagrams and to the specific examples. Thus, it will be apparent from the diagrams that glasses having a transformation temperature between about 125° and 225°C, and water solubility between 0.01 and about 5.5%/min at 100°C can be obtained by variation of the alkaline oxide proportions and control of the refining conditions as described below. Preferred compositions are those having a water solubility between 0 and 2.0 %/min at 100°C more preferably between 0 and 1.1 %/min at 100°C. Preferably also the transformation temperature does not exceed 200°C. Thus, for example for a lithium-barium borophosphate glass prepared under standard conditions as described in the Examples the transformation temperature exceeds 200°C when the ratio $BaO:Li_2O$ exceeds 0.667: on the other hand the rate of dissolution in water becomes undesirably high when the ratio $BaO:Li_2O$ is less than 0.25. For a sodium-barium borophosphate glass, the transformation temperature exceeds 200°C when the ratio $BaO : Na_2O$ exceeds 1.5 and the water resistance is undesirably low when this ratio is less than 1.0.

The effect of alteration of the $P_2O_5 : B_2O_3$ ratio is essentially that an increase in the $B_2O_3$ content increases the transformation temperature and melt viscosity of the glass.

Preferably the amount of magnesium oxide present does not exceed 10 mole %, preferably 5 mole %, as compositions having greater proportions of MgO may give rise to glasses containing a disperse crystalline phase. The presence of such crystals in small quantities causes the glass to have a white translucent appearance, which may be undesirable for some applications, and if larger quantities of crystals are formed, the mechanical properties and chemical resistance of the glasses may be adversely affected.

The glass may be prepared by heating together the appropriate oxides, or their precursors. By 'precursor' is meant a compound which on heating will react with the other components present to give the same chemical composition in the product as if the oxide had been used, usually with the evolution of one or more volatile compounds for example water, carbon dioxide and ammonia. Thus suitable precursors of phosphoric oxide include phosphoric acid and ammonium phosphates, while carbonates may be used as precursors of metal oxides. Mixtures of an oxide and precursors of that oxide, or of two or more precursors of the same oxide may be used, and the same compound may be used as a precursor of more than one oxide, thus for example potassium phosphate is a precursor of $K_2O$ and of $P_2O_5$, and sodium borate (borax) is a precursor of $Na_2O$ and of $B_2O_3$.

The heating may be carried out in a two-stage process, in which some or all of the components are first heated together at a relatively low temperature, for example 300°–500°C, to give a glassy mixture (conveniently referred to as the premelt), which is then refined at a higher temperature, for example 500°–800°C. If less than all of the components are present at the initial heating stage the remaining material may be added subsequently before or during the refining stage. This method is convenient for small scale laboratory preparations, but alternatively the components may be mixed together and heated for example to 500°–800°C in a single stage operation. The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

We have found, however, that in the preparation of ultraphosphate glasses, (that is, those in which the number of moles of $P_2O_5$ is more than double the number of moles of alkaline metal oxides), by the twostage process involving an intermediate premelt, the addition of all of the $P_2O_5$ in the form of phosphoric acid may lead to the formation of an intractable crystalline phase at the premelt stage. This problem may be overcome by reducing the unneutralised $P_2O_5$ content of the melt by supplying at least part of the P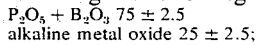$_2O_5$ in the form of an ammonium phosphate, for example ammonium dihydrogen phosphate. Thus in 100 moles of a glass having the composition (moles %) $P_2O_5$ 70, alkaline metal oxides 25, $B_2O_3$ 5, the excess unneutralised $P_2O_5$ is 70–25 = 45 moles. It is found that not more than 60 moles of the $P_2O_5$ may be added as acid if the formation of a crystalline premelt is to be avoided, if the other 10 moles is added as ammonium dihydrogen phosphate. The excess unneutralised $P_2O_5$ is thereby reduced to 35 moles, or half of the total $P_2O_5$ content, and we find that in general, if the excess unneutralised $P_2O_5$ content does not exceed this level, a crystal-free premelt will be formed. If part of the $P_2O_5$ is added in the form of a more fully neutralised precursor such as diammonium hydrogen phosphate, correspondingly more $P_2O_5$ may be added as phosphoric acid.

During refining water is gradually lost, the glass network becomes more highly crosslinked, and the viscosity and transformation temperature (Tg) of the glass increase. Small amounts of volatile oxide components, for example $P_2O_5$, may be lost during the refining stage, and it is desirable to keep the temperature below 800°C when refining glasses according to the invention, to minimise any such loss.

A glass of a give composition may have a range of physical properties, depending upon the refining conditions, and a glass having any desired properties within this range may be obtained by routine experimentation involving selection of the appropriate conditions for example time, temperature and batch size in the refining step. The length of refining time required for a particular glass composition to reach a particular transformation temperature cannot be specified, as it depends upon the size of the batch, the type of furnace and crucible used, the exact temperature of the furnace, the furnace atmosphere and other variables. However, if a given glass composition is refined until it reaches a given transformation temperature, which may be determined by differential thermal analysis of a cooled sampled of the glass, properties such as water resistance will be reproducible from one batch of that composition to another. The residual water in glasses according to the invention may represent up to 5% by weight of the total, but is not included in the compositions set out above, which may thus be regarded as nominal molar compositions in that they are based upon the composition of the initial mixture of components.

The rate at which the glasses are attacked by water may be expressed either as the rate of loss of weight of a standard sample expressed in units of %/min at a given temperature, or as the rate of erosion of a glass surface expressed in units of microns/min. at a given temperature, and in the present application both measurements are used, the relevant units being indicated in each case.

The rate of loss of weight at 100°C is determined by the following procedure: Approximately 2g of molten glass is poured on to a steel plate and allowed to cool. The resulting smooth disc of glass, approximately 2cm in diameter and 0.3 cm thick, is weighed, immersed in boiling water for 1 hour, dried and reweighed. The weight loss divided by the initial weight and multiplied by 100/60 gives the percentage weight loss/minute.

For glasses having good resistance to attack by water the alternative test method, whereby the rate of erosion of the surface at 20°C is measured, gives more accurate results. According to this procedure, the glass is ground and sieved to provide approximately 10g of glass powder of particle size 300–500μm (30–52 mesh BS410). Approximately 5g of the powdered glass is added to a weighed sintered glass crucible having a No. 3 sinter, that is, a sinter having an average pore diameter of 20–30μm. The contents of the crucible are washed with distilled water then with acetone and dried under a vacuum of less than 1 mm Hg air pressure at room temperature for 30 min.

The crucible and its contents are then weighed accurately to determine the initial weight of the glass. A constant-head device is then arranged to maintain a level of 3 cm of distilled water at 20°C in the crucible, which ensures that water flows through the sinter at a rate of approximately 4 ml/min. After 24 hours the crucible and its contents are washed with acetone, dried in vacuum as described above and reweighed to determine the final weight of the glass. The rate of solution is calculated from the equation $$X = 0.28 \left[ 1 - \left( \frac{W_2}{W_1} \right)^{\frac{1}{3}} \right]$$

where
X = rate of soluiton (μm/min)
$W_1$ = initial weight of glass (g)
$W_2$ = final weight of glass (g)

The mean of two determinations is taken. As a rough indication of the correlation between the two methods, a weight loss at 100° of 0.01%/min corresponds approximately to a rate of surface erosion at 20°C of 3 × $10^{-4}$ μ/min.

The transformation temperature of the glass is determined by differential calorimetry using the Du Pont Differential Thermal Analyser. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

The invention is illustrated by the following Examples.

EXAMPLE 1

In this and the following two Examples, the metal oxide components were added to the $P_2O_5/B_2O_3$ premelt before refining. An intimate mixture of 3220 parts by weight of ammonium dihydrogen orthophosphate and 69.7 parts by weight of boric oxide was heated at 425°C for 7 hours to give a clear viscous premelt. This premelt was then further heated at 700°C for 1 hour with the addition of an intimate mixture of 296 parts by weight of lithium carbonate and 153.2 parts by weight of barium oxide and poured onto a steel plate to give a glass with the nominal composition:

$P_2O_5$, 70; $B_2O_3$, 5; $Li_2O$. 20; BaO, 5 moles % and the following properties:
Transformation temperature, 153°C
Rate of solution in water at 100°C, 0.19%/min.

EXAMPLE 2

An intimate mixture of 3220 parts by weight of ammonium dihydrogen orthophosphate and 69.7 parts by weight of boric oxide was heated at 425°C for 7 hours to give a clear viscous premelt. This premelt was then further heated at 700°C for 1 hour with the addition of an intimate mixture of 212 parts by weight of sodium carbonate and 459.6 parts by weight of barium oxide and poured onto a steel plate to give a glass with the nominal composition: $P_2O_5$, 70; $B_2O_3$ 5; $Na_2O$, 10; BaO, 15 moles % and the following properties:
Transformation temperature 198°C
Rate of solution in water at 100°C, 0.05 %/min

EXAMPLE 3

3220 parts by weight ammonium dihydrogen orthophosphate were intimately mixed with 69.7 parts by weight boric oxide in a 2-liter borosilicate glass beaker and heated for 7 hours at 500°C to give a clear viscous melt.

This was further heated for 1 hour with the addition of 148 parts by weight lithium carbonate, 212 parts by weight sodium carbonate and 152.6 parts by weight barium oxide in a muffle furnace at 700°C. The melt was then poured to give a glass of nominal composition:
$P_2O_5$, 70; $B_2O_3$, 5; $Li_2O$, 10; $Na_2O$, 10; BaO, 5 moles % and the following properties:
Transformation temperature = 149°C
Rate of solution in water at 100°C = 0.02 %/min
Rate of erosion in water at 20°C = $1.4 \cdot 10^{-3}$ $\mu$/min.

EXAMPLE 4

This example illustrates the failure of orthophosphoric acid as sole precursor of $P_2O_5$ to give a non-crystalline $P_2O_5/B_2O_3$ premelt from which clear glasses could be obtained. 1561 parts by weight 88% aqueous orthophosphoric acid were mixed with 69.7 parts by weight of boric oxide in a 2-liter borosilicate glass beaker and heated in a vertical furnace for 7 hours at 500°C to give a mainly crystalline material. Further heating of this product at 700°C with additions of alkali carbonates and/or alkaline earth metal oxides failed to yield a clear glass.

EXAMPLE 5

This example illustrates the failure to obtain a crystal-free premelt when orthophosphoric acid was used as sole precursor of $P_2O_5$ in a system where all components were mixed together at the premelt stage.

1558 parts by weight 88% aqueous orthophosphoric acid was mixed with 62.1 parts boric acid, 74.1 parts lithium carbonate, 106 parts sodium carbonate and 76.5 parts barium oxide and heated with stirring in a borosilicate glass beaker at 475° for 7 hours. A partially crystalline premelt with the nominal composition of the glass of Example 3 was obtained, and refining at 700° failed to give a clear glass.

EXAMPLE 6

Premelts were made by heating mixtures as described in Example 5 in which the phosphoric acid was replaced wholly or partially on a molar basis with ammonium dihydrogen orthophosphate. A mixture of 1335 parts (60 molar parts) 88% aqueous phosphoric acid and 230 parts (10 molar parts) ammonium dihydrogen phosphate with the same proportions of the other components as in Example 5 was heated with stirring at 475° in a borosilicate glass beaker to give a clear viscous premelt. Refining at 700° for approximately 1 hour gave a clear glass with the properties of the glass of Example 3.

Compositions containing more ammonium phosphate and less phosphoric acid than the above all gave clear premelts and glasses. Compositions containing more phosphoric acid and less ammonium phosphate gave partially crystalline premelts which did not give clear glasses.

Further glasses according to the invention are illustrated in Table I. All glasses contained 70 mole % $P_2O_5$, 5 mole % $B_2O_3$ and were refined at 700°C 1 hour.

TABLE 1

| Example No. | Proportions of alkaline metal oxides (moles%) | | | | | | Tg °C | Rate of solution in water at 100° (%/min) |
|---|---|---|---|---|---|---|---|---|
| | $Na_2O$ | $Li_2O$ | MgO | CaO | BaO | ZnO | | |
| 7  |      | 15   | 5  |   | 5   |    | 198 | <0.01 |
| 8  |      | 10   | 5  |   | 10  |    | 170 | <0.01* |
| 9  |      | 20   | 5  |   |     |    | 144 | 1.23 |
| 10 |      | 15   | 10 |   |     |    | 173 | 0.02 |
| 11 |      | 17.5 |    |   | 7.5 |    | 163 | 0.04 |
| 12 |      | 15   |    |   | 10  |    | 192 | 0.01 |
| 13 |      | 10   |    |   | 15  |    | 222 | 0.01 |
| 14 |      | 20   |    |   |     | 5  | 128 | 5.3 |
| 15 |      | 15   |    |   |     | 10 | 134 | 3.7 |
| 16 |      | 10   |    |   |     | 15 | 154 | 1.08 |
| 17 | 20   |      | 5  |   |     |    | 178 | 1.0 |
| 18 | 15   |      | 10 |   |     |    | 188 | 0.06 |
| 19 | 20   |      |    |   | 5   |    | 156 | 2.5 |
| 20 | 15   |      |    |   | 10  |    | 166 | 0.79 |
| 21 | 20   |      |    |   |     | 5  | 151 | 3.2 |
| 22 | 15   |      |    |   |     | 10 | 156 | 1.33 |
| 23 | 5    | 15   | 5  |   |     |    | 163 | 0.05 |
| 24 | 10   | 10   | 5  |   |     |    | 156 | 0.05 |
| 25 | 15   | 5    | 5  |   |     |    | 168 | 0.015 |
| 26 | 5    | 15   |    |   | 5   |    | 182 | 0.01 |
| 27 | 15   | 5    |    |   | 5   |    | 160 | 0.55 |
| 28 | 5    | 10   |    |   | 10  |    | 187 | 0.03 |
| 29 | 10   | 5    |    |   | 10  |    | 183 | 0.014 |
| 30 | 7.5  | 7.5  |    |   | 10  |    | 149 | 0.02 |
| 31 | 5    | 5    |    |   | 15  |    | 192 | 0.017 |
| 32 | 5    | 15   |    |   |     | 5  | 146 | 1.42 |
| 33 | 10   | 10   |    |   |     | 5  | 155 | 0.4 |
| 34 | 15   | 5    |    |   |     | 5  | 154 | 2.0 |
| 35 | 10   | 5    |    |   |     | 10 | 149 | 0.2 |
| 36 | 5    | 10   |    |   |     | 10 | 167 | 0.013 |
| 37 | 5    | 5    |    |   |     | 15 | 155 | 0.09 |

TABLE 1-continued

| Example No. | Proportions of alkaline metal oxides (moles%) | | | | | | Tg °C | Rate of solution in water at 100° (%/min) |
|---|---|---|---|---|---|---|---|---|
| | Na$_2$O | Li$_2$O | MgO | CaO | BaO | ZnO | | |
| 38 | | 15 | 5 | | | 5 | 164 | 0.04 |
| 39 | | 10 | 5 | | | 10 | 160 | 0.013 |
| 40 | | 5 | 5 | | | 15 | 182 | 0.019 |
| 41 | | 20 | | | 2.5 | 2.5 | 143 | 1.6 |
| 42 | | 10 | | | 10 | 5 | 198 | 0.04 |
| 43 | | 5 | | | 15 | 5 | 218 | 0.01 |
| 44 | | 15 | | | 5 | 5 | 149 | 0.34 |
| 45 | | 10 | | | 5 | 10 | 186 | 0.02 |
| 46 | | 5 | | | 10 | 10 | 195 | 0.06 |
| 47 | | 5 | | | 5 | 15 | 180 | 0.01 |
| 48 | 5 | | | | 15 | 5 | 212 | 0.056 |
| 49 | 10 | | | | 10 | 5 | 195 | 0.03 |
| 50 | 15 | | | | 5 | 5 | 146 | 0.93 |
| 51 | 10 | | | | 5 | 10 | 191 | 0.02 |
| 52 | 5 | | | | 10 | 10 | 197 | 0.01 |
| 53 | 5 | | | | 5 | 15 | 192 | 0.055 |
| 54 | | 25 | | | | | 159 | 2.7 |
| 55 | | | 25 | | | | 148 | 1.9 |
| 56 | | | | | 25 | | 254 | 0.01 |
| 57 | | | | | | 25 | 246 | 0.01 |
| 58 | | 15 | | 5 | | 5 | 170 | 0.07 |

*In Example 8 - the glass had a rate of erosion by water at 20°C of 1.5 × 10$^{-4}$ μ/min.

What we claim is:

1. Inorganic oxide glasses having the following compositions (moles %):
   (P$_2$O$_5$ + B$_2$O$_3$) – 75 ± 2.5
   at least one oxide selected from alkali metal oxides alkaline earths and zinc oxide – 25 ± 2.5,
the total of the foregoing components being at least 99 mole % of the total composition, excluding water, and the molar ratio P$_2$O$_5$ : B$_2$O$_3$ being from 15:1 to 6:1, wherein said glasses have a transformation temperature between 125° and 225°C. and a water solubility between 0.0 and 5.5% per minute at 100°C.

2. Inorganic oxide glasses as claimed in claim 1 containing at least one alkali metal oxide together with at least one oxide selected from alkaline earths and zinc oxide.

3. Inorganic oxide glasses as claimed in claim 2 in which the amount of magnesium oxide present does not exceed 10 mole % of the total composition excluding water.

4. Inorganic oxide glasses as claimed in claim 3 in which the amount of magnesium oxide present does not exceed 5 mole % of the total composition, excluding water.

5. Inorganic oxide glasses as claimed in claim 1 having a transformation temperature, not greater than 200°C.

6. Inorganic oxide glasses as claimed in claim 1 having a rate of solution in water at 100°C, not greater than 1.1% per minute.

7. Inorganic oxide glasses as claimed in claim 1 having a transformation temperature, not greater than 200°C and a rate of solution in water at 100°C, measured as described herein, not greater than 1.1% per minute.

8. A method of preparing an inorganic oxide glass comprising the steps of taking inorganic oxides or their precursors in the molar proportions according to claim 1, and heating them together at a temperature not greater than 800°C.

9. An inorganic oxide glass when prepared by the method of claim 8.

* * * * *